Jan. 25, 1955     J. L. BILLS     2,700,594
APPARATUS FOR PRODUCTION OF UNSATURATED HYDROCARBONS
Filed Dec. 23, 1950     2 Sheets-Sheet 1

INVENTOR.
JOHN L. BILLS,
BY
AGENT.

Jan. 25, 1955 J. L. BILLS 2,700,594
APPARATUS FOR PRODUCTION OF UNSATURATED HYDROCARBONS
Filed Dec. 23, 1950 2 Sheets-Sheet 2
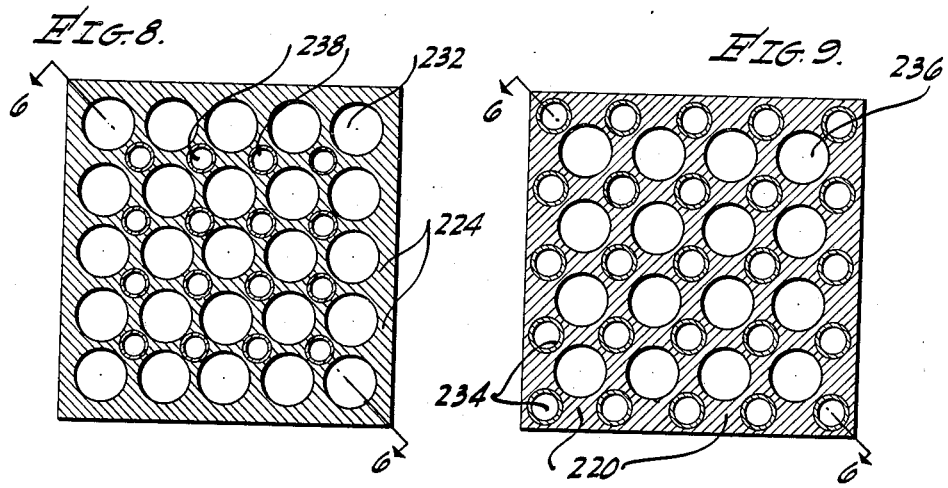
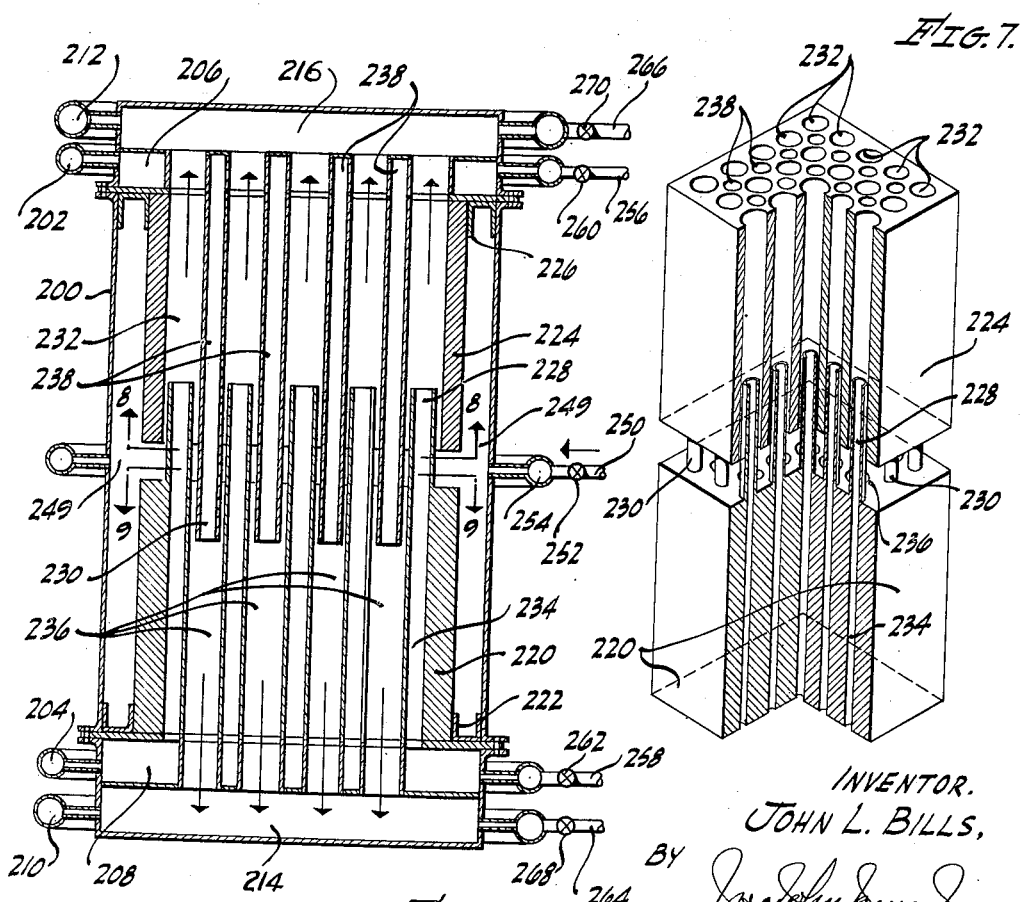
INVENTOR.
JOHN L. BILLS,
BY
AGENT.

United States Patent Office 2,700,594
Patented Jan. 25, 1955

2,700,594

APPARATUS FOR PRODUCTION OF UNSATURATED HYDROCARBONS

John L. Bills, Long Beach, Calif., assignor to Union Oil Company of California, Los Angeles, Calif., a corporation of California Application December 23, 1950, Serial No. 202,515

8 Claims. (Cl. 23—284)

This invention relates to the partial oxidation of hydrocarbon vapors for the production of unsaturated hydrocarbons such as ethylene, acetylene, propylene, butadiene, and the like, and in particular relates to such a partial oxidation process wherein the reaction is made autothermic. The invention further relates to an apparatus of particular construction in which the product gases indirectly preheat the reactant gases to a temperature sufficient to maintain a predetermined reaction temperature.

The manufacture of unsaturated hydrocarbons by partial oxidation is well known and in general a mixture of hydrocarbon vapor and a gas containing oxygen is prepared by mixing either preheated air, commercial oxygen, or another oxygen-containing gas with a preheated hydrocarbon vapor and the mixture is passed into the reaction zone. The usual reaction temperatures are between 800° C. and 1600° C. with very short reaction times generally employed such as between about 0.001 and about 1.0 second. The product gases formed in the reaction desirably are quench cooled to terminate the desired reaction and prevent unwanted side reactions. Usually a spray of water or oil is employed as the quenching medium. Subsequently the desired unsaturated hydrocarbon product is separated from the quenched product stream.

In the production of acetylene by the partial oxidation process indicated, a considerable number of problems are involved which must be solved to yield a process of the highest heat efficiency and to result in the greatest possible conversion of hydrocarbon vapor to acetylene. Generally pure or commercially pure oxygen is required which is considerably more expensive than atmospheric air. The preignition of the mixture of hydrocarbon vapor and oxygen is difficult to prevent thus rendering close control of the reaction uncertain. The reaction product also contains carbon dioxide, the extent of which varies but which usually amounts to about one-half by volume of the quantity of acetylene produced. By most conventional acetylene absorption processes carbon dioxide is absorbed along with the acetylene. Carbon black is also produced simultaneously with the acetylene in most of the partial oxidation processes which not only decreases the conversion efficiency of the hydrocarbon vapor to the desired product but also fouls the apparatus lowering the conversion as well as the heat transfer efficiency.

Of perhaps most importance is the disadvantage involved in quench cooling great quantities of high temperature gases since substantially all of the sensible heat available in these gases at high temperatures is lost by this type of cooling. Much excess heat is required in preheating the reactants and the exothermic heat of reaction is lost in the quench cooling step and heretofore exchanging the hot product gases with the entering reactants has not been successful as a sufficiently rapid product cooling rate is not obtained.

It is an object of the present invention to provide a partial oxidation process of materially increased heat efficiency for the production of unsaturated hydrocarbons.

It is a specific object of this invention to provide an autothermic process for acetylene production by partial oxidation of a hydrocarbon vapor in which no external preheating of reactant gases is required.

Another object of this invention is to provide an autothermic acetylene production process wherein part of the reactant gases are preheated indirectly by the cooling of hot product gases resulting from the reaction of the other part of the reactant gas in an apparatus of special design.

A further object of the present invention is to provide a partial oxidation process for acetylene production which does not require commercial oxygen, excess preheating of the reactant gases, or a separate product quenching step, and involves substantially no production of by-product carbon black.

An additional object of the present invention is to provide an autothermic apparatus for the production of unsaturated hydrocarbons by partial oxidation hereinafter more fully described.

Other objects and advantages of the present invention will become apparent to those skilled in the art as the description thereof proceeds.

Briefly, the present invention comprises a process for the production of unsaturated hydrocarbons through the mechanism of high temperature partial oxidation wherein a reactant gas mixture containing a vaporized hydrocarbon and a gas containing oxygen is divided into two halves, each half is introduced into the opposite ends of a divided reaction zone of special construction whereby each half of the reactant gas reacts at high temperatures while in indirect heat exchange relation to the other half which is flowing through and being preheated in conduits running longitudinally through the divided reaction vessel. Within the reaction zone and particularly within those parts in which elevated temperatures are involved the reactant gases flow linearly and without turbulence or obstruction to the flow, both of which have been found to adversely affect the acetylene yield.

Into the preheated reactants is introduced a stream of hydrogen-containing gas whereby the reaction of the autothermically preheated reactant gases is initiated and the formation of by-product carbon black is prevented. The product gas is removed at a relatively low temperature from the opposite end of the reaction vessel from which it was introduced.

Thus two streams of reactant gases are introduced and two streams of product gases are removed, the gases passing countercurrent to one another and in indirect heat exchange relationship. By this means the high temperature product gases, evolving from the reaction of one-half of the reactant gas, are cooled by indirect heat exchange thereby preheating the other one-half of the reactant gas. Thermal energy is therefore recirculated within the reactor, being indirectly exchanged from one hot product stream to the other reactant gas stream and external preheating of reactant gases is eliminated.

The reactor in which this process is carried out may be considerably varied in form as will become apparent in connection with the description of the accompanying drawings, but generally the reactor involves a reaction vessel divided transversely into two adjacent reactant chambers. Each reaction chamber is provided with at least one and preferably a plurality of reactant gas preheating tubes or zones which extend longitudinally through each reaction chamber and open a short distance into the other reaction chamber in the space surrounding a similar set of reactant gas preheating tubes passing in the opposite direction through the other reaction chamber. Thus, each reaction chamber is preferably provided with a plurality of parallel reactant gas preheating tubes which are offset (that is, not coaxial with any of the reactant gas preheating tubes in the other chamber) and which overlap by extending past an imaginary transverse plane at the center of the reaction vessel.

At least one, or preferably a plurality of other longitudinal tubes are disposed within each of the two reaction chambers for the introduction of a hydrogen-containing gas. These tubes may be coaxial, that is, a hydrogen injection and preheating tube in one reaction chamber may open directly opposite and on the same longitudinal axis with a hydrogen injection tube in the other reaction chamber, but they do not overlap and extend just to and not beyond the imaginary transverse plane mentioned above, that is, these tubes do not extend as far through the reaction vessel as do those reactant gas preheating tubes flowing gas in the same direction.

Thus the reactant gas is divided into two halves and one-half is passed through the reactant gas preheating tubes in each of the two reaction chambers and is preheated therein by the cooling of hot product gases surrounding these tubes. The preheated gases react exothermally after leaving the outlet orifice of the preheating tube while flowing through the reaction space surrounding the preheating tubes in the opposite reaction chamber. Thereby the other half of the reactant gas passing through the reactant gas preheating tubes into the other reaction chamber is indirectly preheated.

At the same time the two streams of hot product gas are indirectly heating the two streams of reactant gas, a simultaneous preheating of the hydrogen-containing gas takes place. Thus the reacting flame maintained at the mouth or outlet orifice of each reactant gas preheating tube is subjected to the beneficial action of preheated hydrogen-containing gas.

The process and apparatus of the present invention will be more clearly understood by reference to the accompanying drawings in which:

Figure 6 shows a longitudinal cross section view of a second modification of the apparatus of this invention in which bored or cast refractory blocks containing longitudinal passages are substituted for the refractory tubes employed in the apparatuses of Figures 1 and 3;

Figure 7 is an isometric view in partial longitudinal cross section showing the relative positions of the refractory blocks when arranged for operation; and Figures 8 and 9 are transverse cross sectional views of the two blocks of refractory employed in the apparatus of Figures 6 and 7.

Figure 1:
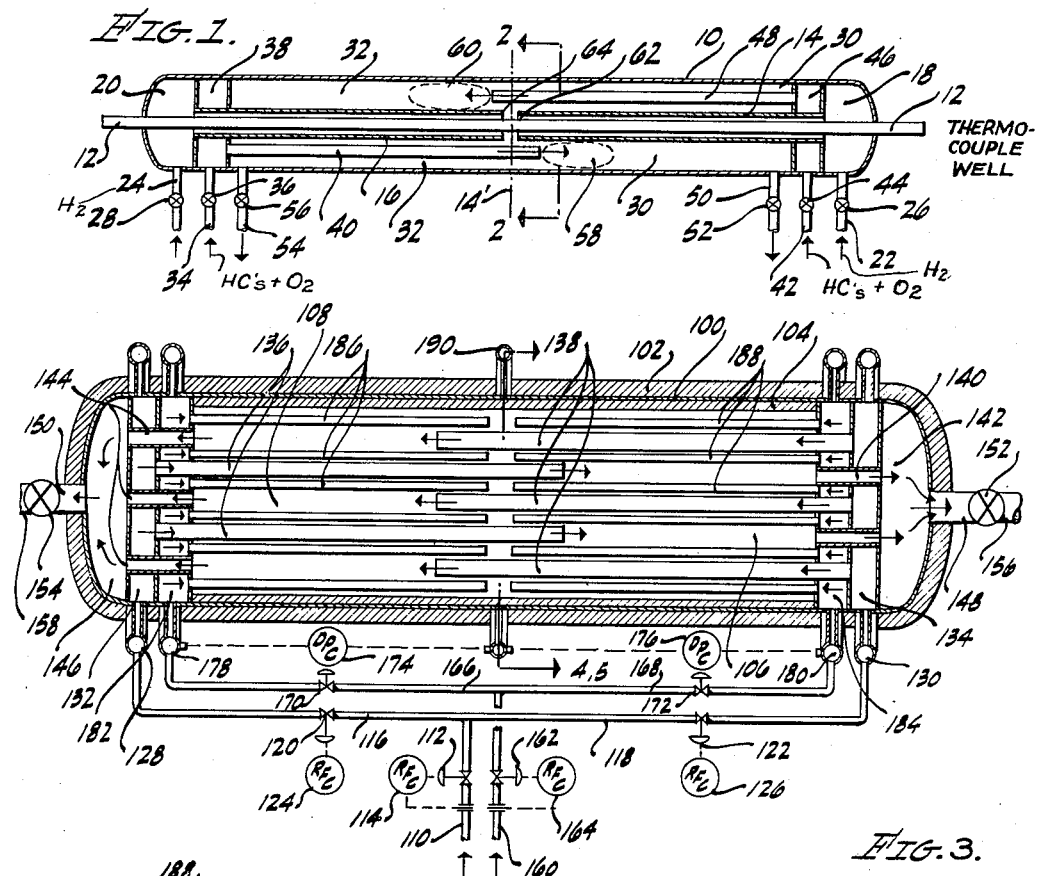
Figure 1 is a longitudinal cross sectional view of one modification of the autothermic apparatus according to this invention.

Referring now more particularly to Figure 1, an elongated reaction vessel 10 is provided with a central thermocouple well 12 extending longitudinally therethrough. Surrounding the thermocouple well 12 and opening opposite each other at a point adjacent an imaginary transverse plane 14' are first and second hydrogen injection tubes 14 and 16 communicating with first and second hydrogen injection header zones 18 and 20. Hydrogen-containing gas is introduced thereinto, respectively, via lines 22 and 24 controlled by valves 26 and 28. Surrounding tubes 14 and 16 are first and second reaction chambers 30 and 32, respectively. A first portion of reactant gas mixture is introduced into first reactant gas header zone 38 via line 34 controlled by valve 36 from which it passes via first reactant gas preheating tube 40 into first reaction chamber 30. A second portion of reactant gas mixture is introduced via line 42 at a rate controlled by valve 44 into second reactant gas header zone 46 from which it passes via second reactant gas preheating tube 48 into second reaction chamber 32. Each fraction of reactant gas mixture while passing respectively through preheating tubes 40 and 48 is indirectly preheated prior to reaction by an indirect heat exchange with hot product gases existing in reaction zones 32 and 30 respectively, surrounding the preheating tubes. An internal recycling of thermal energy is thus maintained by indirect heat transfer from first reaction zone 30 through the wall of second reactant gas preheating tube 48, with the reactant gas into second reaction zone 32 wherein hot product gases are formed, then indirectly through the wall of first preheating tube 40 into the preheating reactant gas therein, and then back to first reaction zone 30 as more hot product gases. Each stream of reactant gas is preheated sufficiently to maintain the desired reaction temperature by indirect heat exchange with the hot product gases resulting from the reaction of the other stream of reactant gas. The flows of hot gases are, of course, countercurrent. Preheated reactant gases need not be introduced therefore into the reaction vessel and the process is autothermic. Cooled product gases are removed in two streams, a first product stream being removed via line 50 controlled by valve 52 from first reaction zone 30, and a second product stream being removed via line 54 controlled by valve 56 from second reaction chamber 32, they may then be combined for storage or further processing.

In each of first and second reaction chambers 30 and 32 are maintained reaction flames 58 and 60. The hydrogen-containing gas introduced as above described passes via lines 14 and 16 to openings 62 and 64 adjacent central transverse plane 14 of the reaction vessel and flows therefrom in opposite directions for direct injection into flames 58 and 60 through the spaces surrounding tubes 48 and 40. Thus direct hydrogen injection into the reactant flames is accomplished with the resultant advantages previously described.

Figure 2:
Figure 2 is a transverse cross sectional view of the apparatus of Figure 1.

Referring now more particularly to Figure 2, a transverse cross section of the reaction vessel is shown showing the relationship of reaction vessel 10, thermocouple well 12, the hydrogen injection tubes 14 and 16, and the plurality of reactant gas preheating tubes 40 and 48. In the particular transverse section shown in this figure the cross hatched tubes 40 indicate those opening toward the viewer of the figure from the opposite end of vessel 10.

Figure 3:
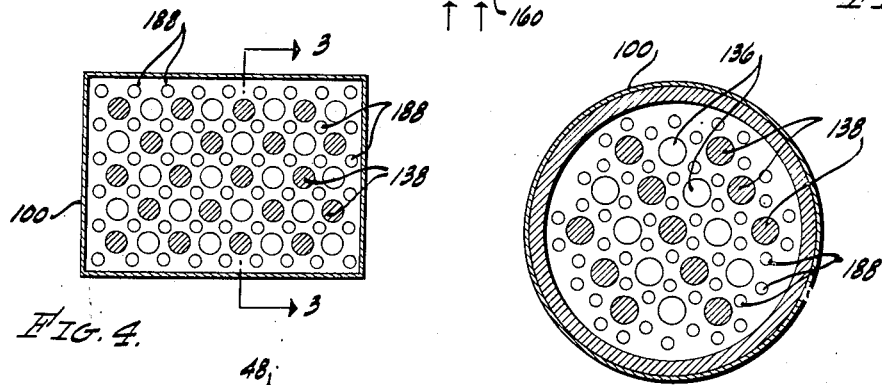
Figure 3 is a longitudinal cross sectional view of a multitube autothermic reactor according to this invention, suitable for commercial scale production of unsaturated hydrocarbons.

Referring now more particularly to Figure 3, a longitudinal cross sectional view of the multitube commercial scale autothermic apparatus according to this invention is shown. An elongated pressure resistant reaction vessel 100 is provided with an outside layer of thermal insulation 102 and an inside layer of refractory material 104. In this modification the first reaction zone or chamber 106 is located surrounding the tubes of the right-hand half of the reactor and the second reaction zone or chamber 108 is located in the left half of the reactor as the drawing is viewed.

A reactant gas mixture is introduced via line 110 at a rate controlled by valve 112 in accordance with recording flow controller 114. This stream is then divided into two equal flows passing respectively through lines 116 and 118 at rates controlled by valves 120 and 122 in accordance with recording flow controllers 124 and 126, respectively. These two flows of reactant gas are subsequently introduced respectively into first and second reactant gas manifolds 128 and 130 and flow respectively into first and second reactant gas headers 132 and 134. The flows of reactant gas then distribute themselves equally among first and second reactant gas preheating tubes 136 and 138. Each reactant gas stream is preheated by indirect heat exchange with a stream of hot product gas produced from the reaction of the other reactant gas stream. These preheated streams are discharged from first reactant gas preheating tubes 136 into first reaction zone 106 and from second reactant gas preheating tubes 138 into second reaction zone 108 as indicated by the arrows in the figure. The hot product gases flowing through the reaction zones 106 and 108 indirectly heat the hydrogen and the reactant gas streams passing in the opposite directions within the tubes in that particular reaction zone. The internal thermal energy recycle described above is therefore established in the present reaction vessel.

Hot products produced in the reaction flame adjacent the openings of the reactant gas preheating tubes are indirectly cooled and the cool products pass from first reaction zone 106 via transfer conduits 140 into first product gas header 142 while the cooled product gases from second reaction zone 108 pass via transfer conduits 144 into second product gas header 146. The cooled product gases are removed from the respective headers 142 and 146 via lines 148 and 150 at rates controlled by valves 152 and 154. The cooled product gas is then sent to storage or further processing facilities not shown via lines 156 and 158 respectively.

The hydrogen-containing gas is introduced via line 160 at a rate controlled by valve 162 in accordance with recording flow recorder 164. The hydrogen stream is subsequently divided into two substantially equal flows passing via lines 166 and 168 at rates controlled by valves 170 and 172 in accordance with differential pressure controllers 174 and 176, respectively. One stream of hydrogen-containing gas is introduced into first hydrogen manifold 178 while the other stream is introduced into second hydrogen manifold 180. From these manifolds the hydrogen-containing gas is introduced respectively into first and second hydrogen headers 182 and 184. Communicating with these hydrogen headers are first hydrogen inlet tubes 186 and second hydrogen inlet tubes 188. These tubes extend from their respective hydrogen headers to a point adjacent imaginary transverse plane 190. From the openings of the hydrogen inlet tubes adjacent this central transverse plane a flow of hydrogen-containing gas progresses in opposite directions and is directly injected into the reaction flames maintained at the outlet opening of each of the reactant gas preheating tubes. The flow of hydrogen-containing gas is maintained in equal proportions into each hydrogen manifold by maintaining a constant and substantially equal differential pressure between the two hydrogen headers and the gas existing between the outlets of the hydrogen injection tubes adjacent the central transverse plane 190.

As greater or smaller production rates are desired, a greater or smaller number of reactant gas preheating tubes may be employed and as few as two or three and as many as several thousand such tubes may be employed to secure the desired production.

Figure 4:
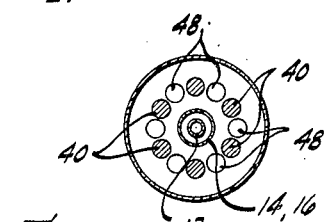
Figures 4 and 5 are transverse cross sectional views showing two permissible tube arrangements for the apparatus of Figure 3.
Figure 5:
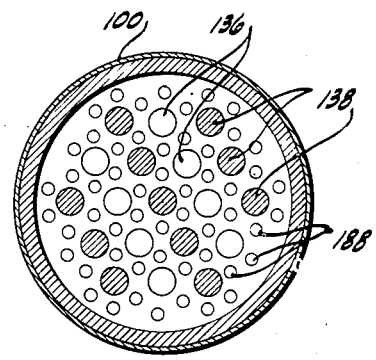

Referring now more particularly to Figures 4 and 5, two different patterns for tube spacing are shown. In Figure 4 a "rectangular" pattern of reactant gas preheating tube and hydrogen injection tube arrangement is shown in which second reactant gas preheating tubes 138 are shaded as discharging toward the viewer while first reactant gas preheating tubes 136 are not shaded. In this tube pattern each reactant gas tube is surrounded by four hydrogen inlet tubes 188. Furthermore, hydrogen inlet tubes 188 are each coaxial with a corresponding hydrogen inlet tubing 186 projecting into a reaction zone from the opposite direction, whereas, the reactant gas preheating tubes are not coaxial with such a corresponding member on the opposite side of the reactor and discharge into an open reaction space surrounding tubes in the other half of the vessel.

In Figure 5 a "triangular" arrangement of tubes is indicated in which first reactant gas preheating tubes 136 and second reactant gas preheating tubes 138 are indicated each surrounded by six hydrogen inlet tubes 188. Either of the foregoing tube patterns may be employed with substantially the same results. When superatmospheric pressure operation is employed a cylindrical vessel 100 is usually required. A greater number of tubes may be maintained within a reactor of given diameter by employing such a triangular tube arrangement as is shown in Figure 5. Simplicity in construction of an atmospheric pressure reactor may be realized by employing the square tube arrangement pattern indicated in Figure 4.

Referring now more particularly to Figures 6 and 7, longitudinal cross section views of another modification of the apparatus of the present invention is shown. In this modification reaction vessel 200 is provided with first and second reactant gas inlet manifolds 202 and 204 which in turn communicate respectively with first and second reactant gas headers 206 and 208. Also provided with vessel 200 are first and second product gas removal manifolds 210 and 212 communicating respectively with first and second product gas headers 214 and 216. Positioned within the central portion of reactor vessel 200 and between the headers established at each end of the reaction vessel are two bored masses of heat treated refractory material such as sillimanite, mullite, or other well known type of dehydrated aluminum silicate ceramic material. The first mass 220 is secured by means of clips 222 adjacent one end of reaction vessel 200, while second mass 224 is secured by means of clips 226 adjacent the other end of the reaction vessel. Each mass is provided with a plurality of uniformly arranged large and small diameter holes bored longitudinally therethrough. The relative arrangement of the bores is such that a large diameter bore in one refractory mass is coaxial with a small diameter bore in the adjacent refractory mass. Both masses have parallel adjacent face planes transverse to the bores. The small diameter holes in each mass are provided with protruding tubes 228 and 230 respectively extending into the larger diameter bored holes coaxial therewith in the opposite mass of refractory. Thus, for example, in Figures 6 and 7 second mass 224 is provided with a plurality of regularly spaced large diameter longitudinal bores 232 providing a plurality of first reaction zones therein. Into each of these large diameter bores 232 extend smaller diameter tubes 228 integral with first refractory mass 220 and which are extensions of second reactant gas preheating bores or zones 234. Similarly the first refractory mass 220 is provided with a plurality of regularly spaced longitudinal large diameter bores 236 into each of which extend smaller diameter tubes 230 which in turn are extensions of first reactant gas preheating bores 238. Tubes 228 and 230 each extend into their coaxial large diameter bores 232 and 236 the same distance. The heat transfer occurs through the refractory material separating the large and small diameter bores in each of the first and second refractory blocks or masses. The hot product gases flowing through the large diameter bores 232 in mass 224 lose their heat indirectly to the reactant gases passing in the opposite direction through small diameter bores 238 thus preheating the reactant gas flowing therethrough. Again an internal recycle of thermal energy between the first and second reaction zones 236 and 232 is provided.

Referring particularly to Figure 6, a hydrogen-containing gas is introduced by means of line 250 controlled by a valve 252 into hydrogen manifold 254. From this ring manifold at a plurality of points hydrogen is introduced into hydrogen header zone 249 lying between the adjacent opposite faces of the refractory masses 220 and 224 for uniform distribution through the annular spaces existing around small diameter tubes 228 and 230 and the large diameter bores 232 and 236. A direct hydrogen injection into the reaction flames is hereby effected.

Reactant gases are introduced via lines 256 and 258 controlled, respectively, by valves 260 and 262 for introduction into ring manifolds 202 and 204, respectively. The product gases are removed from ring manifolds 210 and 212 respectively by lines 264 and 266 controlled by valves 268 and 270, respectively.

Referring now more particularly to Figures 8 and 9 a transverse view of the opposing faces of refractory units 220 and 224 is shown. Figure 9 corresponds to unit 220 while Figure 8 corresponds to unit 224. In these figures small diameter bores 234 and 238 are indicated placed opposite to and coaxially with large diameter bores 232 and 236.

The following data are given to indicate the order of magnitude of external heat required to preheat the reactant gases when the process of this invention is not employed:

EXAMPLE I

In a nonautothermic reactor 1.375 inches inside diameter (I. D.) provided with three 0.25 inch I. D. reactant gas preheating tubes and three hydrogen injection tubes arranged in a circle, the feed gas comprised:

| Component | Rate, s.c.f./hr. | Volume, Percent |
| --- | --- | --- |
| Air | 555 | 54.7 |
| Natural Gas | 185 | 18.2 |
| Hydrogen | 275 | 27.1 |
|  | 1,015 | 100.0 |

This air and natural gas were preheated separately from the hydrogen in a preheating furnace by combustion of 100 s. c. f./hr. of natural gas fuel. A temperature of 2200° F. was maintained in the furnace.

The product gases were quenched with water and the product composition (water-free basis) was analyzed as:

| Component | Volume per cent |
| --- | --- |
| Carbon monoxide | 8.8 |
| Carbon dioxide | 0.9 |
| Hydrogen | 33.3 |
| Methane | 4.0 |
| Acetylene | 3.5 |
| Ethylene | 0.2 |
| Nitrogen | 49.3 |
|  | 100.0 |

The conversion to acetylene was 33.2%. It is to be noted that a volume of natural gas equivalent to 54% of that quantity used in the reactant gas mixture was required for feed preheating and on the basis of natural gas consumed by the process the conversion was only 21.5%.

EXAMPLE II

An apparatus was constructed according to the design shown in Figure 1 in which a plurality of quartz tubes was employed for conducting the gases through the reactor. The length of the reactor between the two product gas outlets was 12 inches and its maximum outside diameter was 0.6 inch. The hydrogen inlet tubes were centrally disposed within the reactor and were 0.213 inch inside diameter and extended to the central transverse plane of the reactor. Surrounding these tubes were disposed 10 reactant gas preheating tubes 0.14 inch in diameter, 5 alternately extending from each end to points 0.25 inch beyond the central transverse plane of the reactor. These tubes were 6.25 inches long. This apparatus was operated with 7.95 standard cubic feet per hour of feed gas and 5.06 standard cubic feet per hour of hydrogen to each half of the reactor. The composition of the reactant feed gas was as follows:

Table 1

| Component: | Volume per cent |
|---|---|
| Air | 66.0 |
| Natural gas | 27.7 |
| Excess oxygen | 6.3 |
| | 100.0 |

The composition of the product gas was as follows:

Table 2

| Component: | Volume per cent |
|---|---|
| Hydrogen | 52.1 |
| Nitrogen | 31.4 |
| Carbon monoxide | 8.6 |
| Acetylene | 3.5 |
| Methane | 3.0 |
| Carbon dioxide | 0.8 |
| Ethylene | 0.5 |
| Oxygen | 0.1 |
| | 100.0 |

In this reaction 34.3% of the natural gas used in the process was converted to acetylene, compared with 21.5% in the nonautothermic process of Example I.

The temperature profile throughout the reactor was as follows:

Table 3

| Locations, Inches from Center | T. ° C. | |
|---|---|---|
| | Right Side | Left Side |
| 0 | 1,325 | 1,325 |
| 1 | 1,235 | 1,095 |
| 2 | 945 | 840 |
| 3 | 695 | 605 |
| 4 | 495 | 410 |
| 5 | 305 | 250 |

In the foregoing operation no external preheating of the reactant gases was necessary and no production of carbon black was indicated.

EXAMPLE III

In a somewhat larger capacity autothermic reactor according to this invention, the reaction vessel was 14.25 inches long between the two product gas outlets and was 1.375 inches in diameter. Six 0.0625 inch inside diameter hydrogen injection tubes extended from each end of the reactor in a hexagonal pattern. Nine 0.125 inch inside diameter reactant gas preheating tubes 7.38 inches long extended from each end of the reactor to point above 0.2 inch beyond a transverse tube-supporting disc located intermediate the ends of the reaction vessel. The reactor vessel and all tubes were fabricated of quartz.

The flow rates of gases to each half of the reactor is given below:

Table 4

| Gas: | Rate, s. c. f./hr. |
|---|---|
| Hydrogen | 28.0 |
| Natural gas | 12.0 |
| Air | 38.0 |
| Oxygen | 2.75 |

The product gas obtained had the following analyzed composition:

Table 5

| Component: | Volume per cent |
|---|---|
| Carbon monoxide | 8.5 |
| Carbon dioxide | 1.2 |
| Hydrogen | 38.9 |
| Oxygen | 1.1 |
| Methane | 2.2 |
| Ethylene | 0.3 |
| Nitrogen | 45.6 |
| Acetylene | 2.94 |

The conversion to acetylene was 30.4%.

EXAMPLE IV

In the preceding example the small excess quantity of oxygen required is eliminated by employing reactant gas preheating tubes of greater length. By employing tubes 14 inches long in a reactor 27.5 inches in length between the two product gas outlets, satisfactory operation is obtained due to the increased heat transfer area without a decrease in the conversion to acetylene.

Thus, with air as the oxygen-containing gas, the length of the reactant gas preheating tubes is preferably between about 75 and 150 times the inside diameter of the tubes and when oxygen-enriched air is employed these lengths may be as low as 40 times the inside diameter of the reactant gas preheating tubes.

The materials of construction used in the bored refractory units referred to or in the multiple tube modification may be quartz, mullite, sillimanite, or other of the well known dehydrated aluminum silicate ceramic materials which will continuously withstand the reaction temperatures on the order of from 1000° C. to 1500° C.

A wide variety of hydrocarbons are suitable for use in the reactant gas mixture, but best results are obtained with non-aromatic hydrocarbons, particularly those which are normally gaseous or liquid and boil below about 400° C. under atmospheric pressure. The term "nonaromatic hydrocarbon" is herein employed as a generic term including saturated and unsaturated aliphatic and cycloaliphatic hydrocarbons but excluding aromatic or benzenoid hydrocarbons.

The normally gaseous saturated aliphatic hydrocarbons, particularly methane and natural gas, are especially preferred by reason of their low cost and ease of handling. Hydrocarbon mixtures, e. g., mixed refinery gases and various petroleum distillates, are also suitable.

When employing a liquid hydrocarbon reactant, exterior means are provided for vaporizing the same prior to its admixture with the oxygen and/or prior to its introduction into the preheating zones, or such vaporization is effected within the preheating zone itself.

The oxygen reactant is pure oxygen itself, oxygen-enriched air, ordinary air, or any other gas containing free oxygen. As previously stated, air is preferred by reason of its lack of cost, and it is one of the features of the present process that the results obtained employing air are comparable or better than those of previous processes in which pure oxygen was employed.

The mol ratio of hydrocarbon to oxygen in the reactant gas varies between rather wide limits, depending upon the identity of the hydrocarbon. When the hydrocarbon is one of relatively high molecular weight, e. g., a petroleum distillate such as kerosene, as many as 10 mols of oxygen should be provided per mol of hydrocarbon. On the other hand, when the hydrocarbon is one of low molecular weight, e. g., methane, an excess of the hydrocarbon is employed so that the mol ratio of hydrocarbon to oxygen is suitably between about 1.33/1 and about 2.0/1. Thus, the mol ratio of hydrocarbon to oxygen varies from 0.1 to 2.0 depending upon the nature of the hydrocarbon.

When the oxygen reactant is provided in the form of air and the hydrocarbon is natural gas, the reactant gas may comprise from about 17 to about 30 per cent by volume of natural gas and correspondingly, from about 83 to about 70 per cent by volume of air. When the reactant gas comprises air and a petroleum distillate such as kerosene, it may contain from about 4 to about 10 per cent by volume of the hydrocarbon and from about 96 to about 90 per cent by volume of air.

The amount of hydrogen which is admixed with the reactant gas within the reaction zone may be varied considerably. Usually, however, from about 0.5 to about 5 mols, preferably from about 1.5 to about 3 mols, of hydrogen are provided per mol of hydrocarbon in the reactant gas.

The temperature to which the reactant gas is preheated during its passage through the preheating zone is such that the temperature attained in the reaction which is induced by the injection of hydrogen is between about 1100° C. and about 1500° C., preferably between about 1275° C. and about 1375° C. The preheat temperature necessary to attain a reaction temperature within this range depends upon a number of factors, including the composition of the reactant gas, the residence time within the preheating zone, and the amount of turbulent mixing of the reactant gas components which may take place during the preheating. All of these variables are factors which contribute to the possibility of reaction occurring between the reactant gas components during the preheating and in the absence of the added hydrogen. Inasmuch as it is desirable to avoid such reaction, these variables are controlled so that the preheat temperature is sufficient to attain the desired subsequent reaction temperature but is not so high that reaction between the components of the reactant gas takes place to any substantial extent during the preheating. Accordingly, with reactant gas mixtures of the compositions previously given it is usually desirable to preheat as rapidly as possible, e. g., in from about 0.005 to about 0.5 second, and to avoid obstructed flow which would cause turbulent mixing during the preheating. Thus, it is usually preferred to combine the components of the reactant gas prior to preheating the same, and to pass the mixture through the preheating zone at a relatively high rate of flow. Under ordinary conditions of operation the preheat temperature will be between about 600° C. and about 1150° C. with a preheat time between about 0.1 and about 0.005 second. When air is employed as the source of oxygen the preheat temperature will usually be in the upper end of this range, e. g., from about 950° C. to about 1150° C. When pure oxygen is employed the preheat temperature will be somewhat lower, e. g., 600°–1000° C.

The reaction time, i. e., the time interval between admixture of the reactant gas with the hydrogen and the cooling of the product gas to a relatively low temperature, and the reaction temperatures are more or less interdependent, shorter reaction times being employed at higher temperatures and vice versa. Usually such time is between about 0.001 and about 0.05 second, preferably between about 0.002 and about 0.02 second, and is readily controlled by varying the rate at which the reactant gas and hydrogen are introduced into, and the product gas withdrawn from, the reaction zone.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. An autothermic apparatus for the production of unsaturated hydrocarbons by partial oxidation which comprises a closed elongated reaction vessel, at least one elongated conduit extending longitudinally through said vessel from a point adjacent to one end thereof and terminating in an opening at a point beyond and adjacent an imaginary transverse plane intermediate the ends of said vessel, at least one other elongated conduit extending longitudinally through said vessel from a point adjacent the other end thereof and terminating in an opening at a point beyond and adjacent said imaginary transverse plane so that said conduits each extend from opposite ends of said vessel and overlap at the middle of the longitudinal axis of said vessel, separate means for introducing reactant gases into each of said conduits at points adjacent the ends of said vessel, separate outlet conduits for product gases from each end of said vessel, and inlet conduit means for introducing a hydrogen-containing gas into said reaction vessel at a point substantially at said imaginary transverse plane.

2. An apparatus for the autothermic production of unsaturated hydrocarbons which comprises a closed elongated reaction vessel divided by an imaginary central transverse plane intermediate the ends of said vessel into a first reaction volume between said plane and one end of said vessel and a second reaction volume between said plane and the other end of said vessel, at least one first reactant gas preheating conduit extending from one end of said vessel longitudinally through said second reaction volume and terminating in an outlet opening at a point beyond and adjacent said imaginary central transverse plane in said first reaction volume, at least one second reactant gas preheating conduit extending from the other end of said vessel longitudinally through said first reaction volume and terminating in an opening at a point beyond and adjacent said transverse plane in said second reaction volume, means for introducing a hydrogen-containing gas into said closed reaction vessel at a point adjacent said imaginary transverse plane, and separate outlet conduits for product gases from each of said reaction volumes and opening therefrom at points adjacent the ends of said vessel.

3. An apparatus according to claim 2 wherein said means for introducing said hydrogen-containing gas comprises at least one hydrogen preheating conduit extending from one end of said vessel longitudinally therethrough and terminating in an open end adjacent said imaginary transverse plane.

4. An apparatus according to claim 2 wherein a plurality of each of said first and second reactant gas preheating conduits are employed, each communicating respectively with first and second reactant gas headers, said reactant gas headers being disposed adjacent the opposite ends of said vessel, said first and second reaction volumes comprise a plurality of elongated conduits communicating respectively with a first and second product gas header also disposed adjacent the opposite ends of said vessel, a separate reactant gas inlet conduit opening into each of said first and second reactant gas headers, and separate product gas outlet conduits opening from said first and second product gas headers.

5. An apparatus according to claim 4 wherein said means for introducing said hydrogen-containing gas comprises in combination first and second hydrogen gas headers disposed adjacent said first and second reactant gas headers at each end of said vessel, an inlet conduit opening into each of said hydrogen gas headers, and a plurality of first and second hydrogen preheating conduits parallel to and uniformly distributed among said first and second reactant gas preheating conduits respectively and extending respectively from said first and second hydrogen gas headers to points adjacent said imaginary transverse plane.

6. An apparatus according to claim 4 wherein said first and second reactant gas preheating conduits comprise elongated tubular conduits surrounded respectively by said second and first reaction volumes within said vessel.

7. An apparatus according to claim 4 wherein said reaction vessel is provided with a pair of refractory masses with adjacent faces spaced apart adjacent said imaginary central transverse plane in said vessel, said masses being disposed within said vessel leaving a gas space between the outer surfaces of said masses and the inner walls of said vessel, said masses extending from adjacent said imaginary transverse plane to points adjacent said gas headers within said vessel, each of said masses being provided with a plurality of uniformly arranged relatively large conduits and relatively small diameter conduits passing therethrough and having axes parallel to each other and to the longitudinal axes of said vessel, each of the relatively larger diameter conduits in one refractory mass being coaxial with a relatively small diameter conduit in the other refractory mass, each small diameter conduit in each refractory mass being provided with an extension projecting therefrom to a point beyond the face of the refractory mass and coaxially into the opposite large diameter conduit therein, peripheral fluid tight seals between said vessel and each of said masses adjacent the ends thereof farthest from said imaginary transverse plane and forming an open volume surrounding said masses within said vessel communicating with an open volume between the adjacent phases thereof, and an inlet conduit for gas opening into said space.

8. An apparatus according to claim 7 wherein said extensions of said relatively smaller diameter conduits are all substantially equal in length and an annular space is formed between each of said extensions and each of said relatively larger diameter conduits into which said extensions project, said annular space communicating with said space between said adjacent faces and surrounding said refractory masses.

References Cited in the file of this patent

UNITED STATES PATENTS

| Number | Name | Date |
|---|---|---|
| 1,940,209 | Fischer et al. | Dec. 19, 1933 |
| 1,965,770 | Burgin | July 10, 1934 |
| 1,991,354 | Plummer et al. | Feb. 12, 1935 |
| 2,034,715 | Dreyfus | Mar. 24, 1936 |
| 2,263,363 | Menshih | Nov. 18, 1941 |
| 2,498,444 | Orr, Jr. | Feb. 21, 1950 |